(12) United States Patent
Li et al.

(10) Patent No.: US 12,275,869 B2
(45) Date of Patent: Apr. 15, 2025

(54) HIGH STRENGTH LONG OPEN TIME POLYURETHANE REACTIVE HOT MELT

(71) Applicant: Henkel AG & Co. KGaA, Duesseldorf (DE)

(72) Inventors: Yingjie Li, Elgin, IL (US); Shuhui Qin, Elgin, IL (US); Jeanne Li, Elgin, IL (US)

(73) Assignee: Henkel AG & Co. KGaA, Duesseldorf (DE)

( * ) Notice: Subject to any disclaimer, the term of this patent is extended or adjusted under 35 U.S.C. 154(b) by 637 days.

(21) Appl. No.: 16/817,850

(22) Filed: Mar. 13, 2020

(65) Prior Publication Data

US 2020/0216730 A1   Jul. 9, 2020

Related U.S. Application Data

(63) Continuation of application No. PCT/US2018/052121, filed on Sep. 21, 2018.

(60) Provisional application No. 62/561,786, filed on Sep. 22, 2017.

(51) Int. Cl.
| | |
|---|---|
| C09J 175/08 | (2006.01) |
| C08G 18/40 | (2006.01) |
| C08G 18/42 | (2006.01) |
| C08G 18/48 | (2006.01) |
| C08G 18/62 | (2006.01) |
| C08G 18/76 | (2006.01) |
| C09J 5/00 | (2006.01) |
| C08K 3/26 | (2006.01) |

(52) U.S. Cl.
CPC ........ *C09J 175/08* (2013.01); *C08G 18/4018* (2013.01); *C08G 18/4063* (2013.01); *C08G 18/4238* (2013.01); *C08G 18/4277* (2013.01); *C08G 18/4808* (2013.01); *C08G 18/4825* (2013.01); *C08G 18/6225* (2013.01); *C08G 18/6229* (2013.01); *C08G 18/7671* (2013.01); *C09J 5/00* (2013.01); *C08G 2170/20* (2013.01); *C08K 2003/265* (2013.01); *C09J 2475/00* (2013.01)

(58) Field of Classification Search
CPC .... C09J 175/08; C08G 18/4018; C08G 18/12; C08G 18/307
See application file for complete search history.

(56) References Cited

U.S. PATENT DOCUMENTS

| | | | |
|---|---|---|---|
| 4,775,719 A | 10/1988 | Markevka et al. | |
| 4,808,255 A | 2/1989 | Markevka et al. | |
| 4,999,407 A | 3/1991 | Gilch et al. | |
| 5,021,507 A * | 6/1991 | Stanley | C09J 175/04 521/159 |
| 5,173,538 A | 12/1992 | Gilch et al. | |
| 5,827,393 A | 10/1998 | Kinzelmann et al. | |
| 5,866,656 A | 2/1999 | Hung et al. | |
| 6,465,104 B1 | 10/2002 | Krebs et al. | |
| 6,635,722 B2 * | 10/2003 | Li | C08G 18/12 528/53 |
| 7,025,853 B2 | 4/2006 | Kesselmayer | |
| 8,246,777 B2 | 8/2012 | Pind et al. | |
| 9,464,155 B2 | 10/2016 | Kanagawa et al. | |
| 9,487,687 B2 | 11/2016 | Ninomiya et al. | |
| 10,800,957 B2 | 10/2020 | Schmider et al. | |
| 2004/0010095 A1 * | 1/2004 | Kesselmayer | C08G 18/6629 525/453 |
| 2013/0345354 A1 * | 12/2013 | Tamogami | C08G 18/4238 524/507 |
| 2015/0322314 A1 * | 11/2015 | Franken | C08G 18/4213 524/97 |
| 2017/0058162 A1 | 3/2017 | Slark et al. | |
| 2022/0235249 A1 * | 7/2022 | Sutyak | C08G 18/4808 |

FOREIGN PATENT DOCUMENTS

| | | |
|---|---|---|
| CA | 3010144 A1 | 7/2017 |
| CN | 1468926 A | 1/2004 |
| CN | 101314267 A | 12/2008 |
| CN | 103865465 A | 6/2014 |
| CN | 106459723 A | 2/2017 |
| EP | 0764670 A1 | 3/1997 |
| JP | H1036481 A1 | 2/1998 |
| JP | 2007211150 A | 8/2007 |
| JP | 2008500406 A | 1/2008 |
| JP | 2009286883 A | 12/2009 |

(Continued)

OTHER PUBLICATIONS

Elvacite 2013 Technical Data Sheet 07132022 (Year: 2022).*

(Continued)

*Primary Examiner* — Michael M Dollinger
(74) *Attorney, Agent, or Firm* — Sun Hee Lehmann

(57) ABSTRACT

Disclosed is a moisture reactive hot melt adhesive composition prepared from a combination comprising a polyisocyanate, at least one polyether polyol polymer, an acrylic polymer, an inorganic filler and a polyester diol having a structure of Formula 1 or of Formula 2. Formula 1 is:

$$H\text{-}[O(CH_2)_mOOC(CH_2)_nCO]_k\text{-}O(CH_2)_{m\text{-}OH};$$

m and n are each an even integer; m+n=8; m and n are each independently selected from 2, 4 or 6; k is an integer from 9 to 55; and the polyol of Formula 1 has a number average molecular weight of about 2,000 to about 11,000. Formula 2, a polycaprolactone polyol, is:

$$HO\text{-}[(CH_2)_5COO]_pR_1\text{-}[OOC(CH_2)_5]_q\text{-}OH;$$

$R_1$ is an initiator such as 1,4'-butanediaol, 1,6'-hexanediol, or ethylene glycol; p is an integer from 0 to 96; q is an integer from 0 to 96; p+q=16 to 96; and the polyol has a number average molecular weight of about 2,000 to about 11,000 or less.

20 Claims, No Drawings

(56) References Cited

FOREIGN PATENT DOCUMENTS

| JP | 2016088948 A | 5/2016 |
| WO | 9216592 A1 | 10/1992 |
| WO | 2013153907 A1 | 10/2013 |
| WO | 2015045635 A1 | 4/2015 |
| WO | 2017004178 A1 | 1/2017 |
| WO | 2017103070 A1 | 6/2017 |

OTHER PUBLICATIONS

Evonik http://adhesive-resins.evonik.com/sites/lists/RE/DocumentsAC/DYNACOLL%20brochurel_06_09_2016.pdf.
International Search Report for International PCT Patent Application No. PCT/US2018/052121 dated Jan. 13, 2019.

* cited by examiner

HIGH STRENGTH LONG OPEN TIME POLYURETHANE REACTIVE HOT MELT

TECHNICAL FIELD

This disclosure relates generally to polyurethane hot melt adhesives and more particularly to polyurethane hot melt adhesives having a long open time, high green strength, high final strength and a significant amount of a non-fossil fuel filler.

BACKGROUND OF THE INVENTION

This section provides background information which is not necessarily prior art to the inventive concepts associated with the present disclosure.

Hot melt adhesives are solid at room temperature but, upon application of heat, they melt to a liquid or fluid state in which form they are applied to a substrate. On cooling, the adhesive regains its solid form. The hard phase(s) formed upon cooling of the adhesive imparts all of the cohesion strength, toughness, creep and heat resistance to the final adhesive. Hot melt adhesives are generally thermoplastic and can be repeatedly heated to a fluid state and cooled to a solid state. Naturally, the thermoplastic nature limits the upper temperature at which such adhesives can be used.

Another class of hot melt adhesives is reactive hot melt adhesives. Reactive hot melt adhesives start out as thermoplastic materials that can be repeatedly heated to a molten state and cooled to a solid state. However, when exposed to appropriate conditions the reactive hot melt adhesive crosslinks and cures to an irreversible solid form. One class of reactive hot melt adhesives are polyurethane hot melt adhesives. Polyurethane hot melt adhesives comprise isocyanate terminated polyurethane prepolymers that react with surface or ambient atmospheric moisture to chain-extend, forming a new polyurethane/urea polymer. Polyurethane prepolymers are conventionally obtained by reacting polyols with isocyanates. The polyurethane prepolymers cure through the diffusion of moisture from the atmosphere or the substrates into the adhesive, and subsequent reaction. The reaction of moisture with residual isocyanate forms carbamic acid. This acid is unstable, decomposing into an amine and carbon dioxide. The amine reacts rapidly with isocyanate to form a urea. The final adhesive product is a crosslinked material polymerized primarily through urea groups and urethane groups.

Green strength refers to initial adhesive strength of the adhesive after application of the molten adhesive to a substrate and before final full curing. High green strength is desirable as it allows bonded parts to be held together by the adhesive without further clamps or fasteners. Open time refers to the length of time after application of the molten hot melt adhesive during which a part can be bonded to the adhesive. A long open time is desirable to allow time for parts in a complex composite structure to be added or repositioned. Once the structure has been assembled a high green strength is desirable to allow the bonded structures to move to the next operation. High final strength is especially advantageous in certain reactive hot melt adhesive end use applications, such as panel lamination and product assembly. Hot melt adhesives, particularly when used in the assembly of structural components, need to be able to withstand wide ranges of temperature in the cured state.

Additives are commonly included in reactive hot melt adhesive formulations. However, large amounts of additives such as fillers negatively affect most reactive polyurethane hot melt adhesives. An additional desire is to create reactive polyurethane hot melt adhesives that can include high levels of non-fossil fuel based, sustainable, renewable additives while maintaining high mechanical strength, long open times and high initial or green strength.

SUMMARY OF THE DISCLOSURE

This section provides a general summary of the disclosure and is not a comprehensive disclosure of its full scope or all features, aspects or objectives.

In at least one embodiment the present disclosure provides a moisture reactive hot melt adhesive composition prepared from a combination comprising a polyisocyanate, at least one polyether polyol polymer, an acrylic polymer, an inorganic filler and a polyester diol having a structure of Formula 1 or of Formula 2.

Formula 1 is:

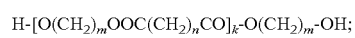

m and n are each an even integer; m+n=8; m and n are each independently selected from 2, 4 or 6; k is an integer from 9 to 55; and the polyol of Formula 1 has a number average molecular weight of about 2,000 to about 11,000.

Formula 2 is:

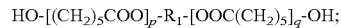

$R_1$ is an initiator such as 1,4'-butanediaol, 1,6'-hexanediol, or ethylene glycol; p is an integer from 0 to 96; q is an integer from 0 to 96; p+q=16 to 96; and the polyol has a number average molecular weight of about 2,000 to about 11,000. Formula 2 is a diol polycaprolactone polyol, which is a specialized form of a polyester diol. Thus, hereinafter when referring to a polyester diol according to this disclosure it is intended to include all polyols having the structures of Formula 1 or 2 and/or mixtures of polyols wherein each polyol in the mixture has a structure of Formula 1 or 2. Polyols not having the structure of Formula 1 and/or Formula 2 are preferably excluded from the composition.

In at least one embodiment the polyester diol polyol according to Formula 1 or 2 has a number average molecular weight of from 2,000 to 11,000 and is present in an amount of from 10 to 35% by weight based on the total adhesive weight.

In at least one embodiment the polyether polyol polymer has a number average molecular weight of from 1,500 to 6,000 and is present in an amount of from 15 to 40% by weight based on the, total adhesive weight.

In at least one embodiment the polyether polyol polymer comprises at least one polypropylene glycol.

In at least one embodiment the acrylic polymer has a weight average molecular weight of from 30,000 to 80,000 and it is present in an amount of from 10 to 40% by weight based on the total adhesive weight.

In at least one embodiment the acrylic polymer has a glass transition temperature of from 35 to 85° C. and a hydroxyl number of less than 8.

In at least one embodiment the polyisocyanate is present in an amount of from 5 to 40% by weight based on the total adhesive weight.

In at least one embodiment the polyisocyanate comprises 4,4'-methylenebisphenyldiisocyanate (4,4'-MDI).

In at least one embodiment the inorganic filler is present in an amount of from about 10 to 50% by weight based on the total adhesive weight.

In at least one embodiment the inorganic filler comprises calcium carbonate.

In at least one embodiment the hot melt adhesive composition further comprises an additive selected from at least one of an additional filler, a plasticizer, a catalyst, a colorant, a rheology modifier, a flame retardant, an UV pigment, a nanofiber, a defoamer, a tackifier, a curing catalyst, an anti-oxidant, an adhesion promoter, a stabilizer, a thixotropic agent and mixtures thereof.

In at least one embodiment the hot melt adhesive composition has an open time of from 6 to 8 minutes.

In one embodiment the disclosure comprises an article of manufacture comprising an uncured or cured hot melt adhesive prepared from a combination comprising a polyisocyanate, at least one polyether polyol polymer, an acrylic polymer, an inorganic filler and a polyester diol having a structure of Formula 1 or of Formula 2 as disclosed above.

In one embodiment the disclosure comprises cured reaction products of a hot melt adhesive prepared from a combination comprising a polyisocyanate, at least one polyether polyol polymer, an acrylic polymer, an inorganic filler and a polyester diol having a structure of Formula 1 or of Formula 2 as disclosed above.

In one embodiment the disclosure is a method of bonding two substrates together comprising applying a hot melt adhesive prepared from a combination comprising a polyisocyanate, at least one polyether polyol polymer, an acrylic polymer, an inorganic filler and a polyester diol having a structure of Formula 1 or of Formula 2 as disclosed above.

The disclosed compounds include any and all isomers and stereoisomers. In general, unless otherwise explicitly stated the disclosed materials and processes may be alternately formulated to comprise, consist of, or consist essentially of, any appropriate components, moieties or steps herein disclosed. The disclosed materials and processes may additionally, or alternatively, be formulated so as to be devoid, or substantially free, of any components, materials, ingredients, adjuvants, moieties, species and steps used in the prior art compositions or that are otherwise not necessary to the achievement of the function and/or objective of the present disclosure.

The word "about" or "approximately" as used herein in connection with a numerical value refer to the numerical value ±10%, preferably ±5% and more preferably ±1% or less.

These and other features and advantages of this disclosure will become more apparent to those skilled in the art from the detailed description of a preferred embodiment. The drawings that accompany the detailed description are described below.

DETAILED DESCRIPTION OF A PREFERRED EMBODIMENT

Unless specifically noted, throughout the present specification and claims the term molecular weight when referring to a polymer refers to the polymer's number average molecular weight (Mn). The number average molecular weight $M_n$ can be calculated based on end group analysis (OH numbers according to DIN EN ISO 4629, free NCO content according to EN ISO 11909) or can be determined by gel permeation chromatography according to DIN 55672 with THF as the eluent. If not stated otherwise, all given molecular weights are those determined by gel permeation chromatography.

An adhesive's open time refers to the time during which an adhesive can bond to a material.

An adhesive's green strength refers to the initial holding strength prior to full chemical cure and in particular in the present specification and claims it refers to the strength developed within the first 30 minutes after application of an adhesive composition to a substrate.

Polyurethane hot melt adhesives find widespread use in panel lamination procedures. They provide good adhesion to a variety of materials and good structural bonding. Their lack of a need for a solvent, rapid green strength, and good resistance to heat, cold and a variety of chemicals make them ideal choices for use in the building industries. In particular they find use in recreation vehicle panel lamination and doors. Because forming these structures can involve complex laminations it is important to have open times of 6 minutes or greater, preferably 6 to 10 minutes, more preferably 6 to 8 minutes and high green strength. In addition, the final strength needs to be maintained even when the cured assembly is exposed to temperature extremes. It is desirable to provide reactive polyurethane hot melt adhesives which retain cured strength at higher temperatures than prior formulations to allow for additional uses.

The present disclosure is directed toward providing reactive polyurethane hot melt adhesives that have the following properties: long open times of greater than 6 minutes, preferably 6 to 10 minutes, more preferably 6 to 8 minutes; high green strength of greater than 120 pounds per square inch (psi) within 30 minutes after application to a substrate; high final cured mechanical strength of at least one of a yield strength of greater than or equal to 607 psi and/or a tensile strength of greater than or equal to 1415 psi; and temperature stability with a storage modulus at 90° C. of equal to or greater than 2.59 E+06. These reactive polyurethane hot melt adhesives can incorporate high levels of sustainable, renewable, non-fossil fuel components such as fillers while maintaining their desirable properties. The present disclosure demonstrates the use of certain crystalline polyester diols meeting a defined structure, namely Formulas 1 or 2 that provide these benefits to polyurethane hot melt adhesives.

The present disclosure reveals that incorporation of certain crystalline polyester diol polymers meeting Formulas 1 or 2 into the hot melt adhesive provides these benefits. As known to one of skill in the art polyester polyols are typically made by polymerization of diols and dicarboxylic acids. In particular, polyester diol polymers that have the structure of Formula 1 or Formula 2 and that have a number average molecular weight of 2,000 to 11,000 Daltons are useful in the present disclosure. The polyester diol polymers are preferably used at a level of from 10 to 35% by weight, and more preferably from 10 to 30% by weight based on the total adhesive weight. Preferably the polyester diol polymer has a number average molecular weight of from 2,000 to 10,000, more preferably from 2,500 to 6,000. For the polyester diol polymers, according to the present disclosure the relationship between the number average molecular weight (Mn), functionality of the polyol (f) and the hydroxyl number of the polyol (OH#) can be expressed by the following equation Mn=(f)*(56100/OH#), Formula 1 is:

m and n being an even integer; m+n=8; m and n are independently selected from 2, 4 or 6; k is an integer from 9 to 55; and the polyol of Formula I has a number average molecular weight of around 2,000 to 11.000.

Formula 2, the polycaprolactone, is:

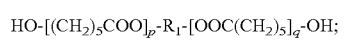

$R_1$ is an initiator such as 1,4'-butanediaol, 1,6'-hexanediol, or ethylene glycol; p is an integer from 0 to 96; q is an integer from 0 to 96; p+q=16 to 96; and the polyol has a number average molecular weight of around 2,000 to 11,000.

The present disclosure is also directed to creating a polyurethane hot melt adhesive that can include high levels of non-fossil fuel based, renewable and sustainable components, especially as fillers. Prior attempts to utilize large amounts of such fillers have resulted in hot melt adhesives that have short open times and other issues.

Polyurethane hot melt adhesives according to the present disclosure preferably comprise: an acrylic polymer, a polyether polyol polymer, a polyester diol polymer according to Formula 1 or Formula 2, a polyisocyanate and an inorganic filler.

The hot melt adhesives according to the present disclosure can be applied in a variety of manners including by spraying, roller coating, extruding and as a bead. The disclosed hot melt adhesive can be prepared in a range of viscosities and is stable during storage as long as moisture is excluded and in the molten state during application. It can be applied to a range of substrates including metals, wood, plastics, glass and textiles.

Examples of suitable fillers for use in the present disclosure include inorganic materials such as calcium carbonate, kaolin and dolomite. Calcium carbonate has been referred to as a non-fossil fuel based, sustainable, renewable material. Other examples of suitable fillers can be found in Handbook of Fillers, by George Wypych $3^{rd}$ Edition 2009 and Handbook of Fillers and Reinforcements for Plastics, by Harry Katz and John Milewski 1978. The inorganic filler is preferably present in an amount of from about 10% to about 50% by weight, more preferably from 15% to 40% by weight based on the total adhesive weight.

Organic polyisocyanates, which may be used in the present disclosure, include alkylene diisocyanates, cycloalkylene diisocyanates, aromatic diisocyanates and aliphatic-aromatic diisocyanates. Examples of suitable isocyanates for use in the present disclosure include, by way of example and not limitation: methylenebisphenyldiisocyanate (MDI), isophoronediisocyanate (IPDI), hydrogenated methylenebisphenyldiisocyanate (HMDI), toluene diisocyanate (TDI), ethylene diisocyanate, ethylidene diisocyanate, propylene diisocyanate, butylene diisocyanate, trimethylene diisocyanate, hexamethylene diisocyanate, cyclopentylene-1, 3-diisocyanate, cyclo-hexylene-1,4-diisocyanate, cyclohexylene-1,2-diisocyanate, 4,4'-diphenylmethane diisocyanate, 2,2-diphenylpropane-4,4'-diisocyanate, xylylene diisocyanate, 1,4-naphthylene diisocyanate, 1,5-naphthylene diisocyanate, m-phenylene diisocyanate, p-phenylene diisocyanate, diphenyl-4,4'-diisocyanate, azobenzene-4,4'-diisocyanate, diphenylsulphone-4,4'-diisocyanate, 2,4-tolylene diisocyanate, dichlorohexa-methylene diisocyanate, furfurylidene diisocyanate, 1-chlorobenzene-2,4-diisocyanate, 4,4',4"-triisocyanatotriphenylmethane, 1,3,5-triisocyanato-benzene, 2,4,6-triisocyanato-toluene, 4,4'-dimethyldiphenyl-methane-2,2',5,5-tetratetraisocyanate, and the like. While such compounds are commercially available, methods for synthesizing such compounds are well known in the art. Preferred isocyanate-containing compounds are isomers of methyenebisphenyldiisocyanate (MDI), isophoronediisocyante (IPDI), hydrogenated MDI (HMDI) and toluene diisocyanate (TDI). The isocyanate component is typically used in the formulation at a level of from about 5% to about 40% by weight, more preferably from 5% to 25%.

Examples of suitable acrylic polymers include those foiled from acrylates, methacrylates and mixtures thereof as known in the art. Acrylic copolymers comprising at least one of methyl methacrylate monomers and n-butyl methacrylic monomers are preferred. Examples of these preferred acrylic copolymers include Elvacite® 2013, which is a methyl methacrylate and n-butyl methacrylate copolymer having a weight average molecular weight of 34,000; Elvacite® 2016, which is a methyl methacrylate and n-butyl methacrylate copolymer having a weight average molecular weight of 60,000; and Elvacite® 4014 which is copolymer of methyl methacrylate, n-butyl methacrylate and hydroxyethyl methacrylate and has a weight average molecular weight of 60,000. The Elvacite® polymers are available from Lucite International. Additional examples of suitable acrylic polymers can be found in U.S. Pat. Nos. 6,465,104 and 5,021,507 herein incorporated by reference. The acrylic polymer may include active hydrogens or not. Preferably the acrylic polymer has a weight average molecular weight of from 30,000 to 80,000, more preferably from 45,000 to 70,000. It is preferably present in an amount of from about 10% to 40% by weight, more preferably from 15% to 25% by weight based on the total adhesive weight. The acrylic polymer preferably has an OH number of less than 8, more preferably less than 5. The acrylic polymer preferably has a glass transition temperature Tg of from about 35 to about 85° C., more preferably from 45 to 75° C.

Examples of suitable polyether polyol polymers include linear and branched polyethers having hydroxyl groups. Examples of the polyether polyol may include a polyoxyalkylene polyol such as polyethylene glycol, polypropylene glycol, polybutylene glycol and the like. Further, a homopolymer and a copolymer of the polyoxyalkylene polyols may also be employed. Particularly preferable copolymers of the polyoxyalkylene polyols may include an adduct of at least one compound selected from the group ethylene glycol, propylene glycol, diethylene glycol, dipropylene glycol, triethylene glycol, 2-ethylhexanedio1-1,3, glycerin, 1,2,6-hexane triol, trimethylol propane, trimethylol ethane, tris (hydroxyphenyl)propane, triethanolamine, triisopropanolamine, ethylenediamine and ethanolamine. Most preferably the polyether polyol polymer comprises a polypropylene glycol. Preferably the polyether polyol has a number average molecular weight of from 1,500 to 6,000 with a more preferred range of 2,000 to 4,000 Daltons. In the adhesive formulation, it is preferably present in an amount of about 15% to 40% by weight based on the total adhesive weight and more preferably from 20% to 35% by weight. The polyether polyol polymer may comprise a mixture of polyether polyol polymers.

The adhesive can optionally include a catalyst. Some useful catalysts include, for example 2,2'-dimorpholinodiethylether, triethylenediamine, dibutyltin dilaurate and stannous octoate. A preferred catalyst is 2,2'-dimorpholinodiethylether. If used, the catalyst is present in an amount of from about 0.01% to about 1 wt.%, preferably 0.02% to 0.5 wt.%, based on the total composition weight.

The adhesive formulation can optionally include one or more of a variety of known hot melt adhesive additives such as additional filler, plasticizer, colorant, rheology modifier, flame retardant, UV pigment, nanofiber, defoamer, compatible tackifier, curing catalyst, anti-oxidant, adhesion promoter, stabilizer, a thixotropic agent such as fumed silica, and the like. Conventional additives that are compatible with a composition according to this invention may simply be determined by combining a potential additive with the composition and determining if they are compatible. An additive is compatible if it is homogenous within the product at room temperature and at the use temperature.

The invention also provides a method for bonding articles together which comprises applying the reactive hot melt adhesive composition of the disclosure in a liquid melt form to a first article, bringing a second article in contact with the composition applied to the first article, allowing the adhesive to cool and solidify and subjecting the applied composition to conditions which will allow the composition to fully cure to a composition having an irreversible solid faun, said conditions comprising moisture. The composition is typically distributed and stored in its solid form and stored in the absence of moisture to prevent curing during storage. The composition is heated to a molten form prior to application and applied in the molten form. Typical application temperatures are in the range of from about 80° C. to about 145° C. Thus, this disclosure includes reactive polyurethane hot melt adhesive compositions in both its uncured, solid form, as it is typically to be stored and distributed, its molten form after it has been melted just prior to its application and in its irreversibly solid form after curing.

After application, to adhere articles together, the reactive hot melt adhesive composition is subjected to conditions that will allow it to solidify and cure to a composition that has an irreversible solid form. Solidification or setting occurs when the liquid melt begins to cool from its application temperature to room temperature. Curing, i.e. chain extending, to a composition that has an irreversible solid form, takes place in the presence of ambient moisture.

The invention is further illustrated by the following non-limiting examples.

EXAMPLES

The following components, in Table 1, were utilized in the examples that follow.

TABLE 1

| Component | |
|---|---|
| PPG2000 | A polypropylene glycol, number average molecular weight of 2,000 from Covestro. |
| PPG4000 | A polypropylene glycol, number average molecular weight of 4,000 from Covestro. |
| Elvacite ® 2016 | A methyl methacrylate n-butyl methacrylate acrylic copolymer with a weight average molecular weight of 60,000, Tg of 55° C., from Lucite International. |
| Elvacite ® 4014 | An acrylic copolymer containing 0.25% by weight hydroxyethyl methacrylate with a weight average molecular weight of 60,000, Tg of 55° C., from Lucite International. |
| Calwhite ® | CaCO$_3$, from Imerys Pigments and Additives |
| ED | Ethane 1,2 diol |
| SuA | Succinic acid |
| ND | 2,2 Dimethylpropane-1,3-diol |
| BD | 1,4 Butanediol |
| AA | Adipic acid |
| HD | 1,6 Hexanediol |
| SA | Sebacic acid |
| DA | Dodecanedioic acid |
| Polyester polyol A | HD/AA with a number average molecular weight of 3,500, such as Piothane ® 3500HA available from Panolam Industries International, Inc. |
| Polyester polyol B | HD/DA, with a number average molecular weight of 3,500, such as Piothane ® 3500HD available from Panolam Industries International, Inc |
| Polyester polyol C | BD/AA, having a number average molecular weight of 3,500 such as Piothane ® 3500BA available from Panolam Industries International, Inc. |
| Polyester polyol D | Polyester polyol A + polyester polyol C 1:1 weight ratio |
| Polyester polyol E | ED/AA, with a number average molecular weight of 3,500 such as Piothane ® 3500EA available from Panolam Industries International, Inc. |
| Polyester polyol F | HD/ND/AA with a number average molecular weight of 3,200 such as Piothane ® 67-3000HNA available from Panolam Industries International, Inc. |
| Polyester polyol G | ED/BD/AA with a number average molecular weight of 3,300 such as Piothane ® 50-3300EBA available from Panolam Industries International, Inc. |
| Polyester polyol H | HD/SA with a number average molecular weight of 3,500 such as Piothane ® 3500HS available from Panolam Industries International, Inc. |
| Polyester polyol I | polycaprolactone, having a number average molecular weight of 4,000 such as CAPA ™ 2402 available from Perstorp. |
| Polyester polyol J | ED/DA, having a molecular weight of 3,500 such as Piothane ® 3500ED available from Panolam Industries International, Inc. |
| Polyester polyol K | HD/SuA, having a number average molecular weight of 3,500 such as Piothane ® 3500H-SA available from Panolam Industries International, Inc. |
| Polyester polyol L | BD/SuA, having a number average molecular weight of 3,500. A polyester diol created by reacting 1,4 butanediol and succinic acid with an excess amount of the 1,4 butanediol to generate a OH# of 32. |
| Polyester polyol M | Polyester polyol A + polyester polyol E, 1:1 weight ratio |
| Polyester polyol N | BD/AA, having a number average molecular weight of about 14,203, such as Piothane ® 11000BA available from Panolam Industries International, Inc. |
| Industrial Control | Technomelt ® PUR 798A a commercial product from Henkel Corporation, Rocky Hill, Connecticut. |

The following generic formulation, Table 2A, was utilized to prepare adhesive examples 1-15 in Table 3 shown below. Table 2B shows the components for example 16 below, which is similar to example 3 except without the filler Calwhite®. All of the polyurethane reactive hot melt adhesive compositions in the following examples, except for the Industrial Control, were prepared using the following method with only the polyester polyols changed as described below in Table 3. The process was as follows: all ingredients except for the polyisocyanate, 4,4'-MDI, were added to a mixer and heated with stirring; the mixture was then dehydrated under vacuum at about 110° C. to about 130° C. for 60 minutes; then the 4,4'-MDI was added to the mixture and the mixture was reacted at 130° C. for 75 minutes; then the formed prepolymer was sealed in a moisture-proof container.

TABLE 2A

| Component | Weight % |
|---|---|
| Polyether polyol, 1:1 weight ratio of PPG2000/PPG4000 | 29.0 |
| Polyester polyol | 14.5 |
| Acrylic polymer, Elvacite ® 2016, except for example 14 which used Elvacite ® 4014 | 20.5 |
| Calwhite ® | 25 |
| 4,4' MDI from Covestro | 11 |

TABLE 2B

| Component | Parts by weight |
|---|---|
| Polyether polyol 1:1 weight ratio of PPG2000/PPG4000 | 29.0 |
| Polyester C | 14.5 |
| Elvacite ® 2016 | 20.5 |
| 4,4'-MDI from Covestro | 9.2 |

A series of hot melt adhesives were prepared as shown in Table 3 below and then tested for a variety of parameters.

The open time was measured as follows: 0.8 grams of the adhesive was dispensed at 121° C. and then a wooden tongue depressor was pressed against the adhesive and the time when no adhesive transferred to the tongue depressor was recorded as the adhesive cooled to ambient temperature of 23° C. So an open time of 8 minutes means that for 8 minutes after being dispensed the adhesive could be transferred to or picked up by a tongue depressor pressed against the adhesive but not after 8 minutes. The viscosity was measured on a Brookfield DV-I+viscometer using a #27 spindle at 121° C.

TABLE 3

| Example | Polyester polyol | Theoretical NCO % | Viscosity cps at 121° C. | Open time |
|---|---|---|---|---|
| 1, control | A | 2.43 | 10875 | ~3 minutes |
| 2, control | B | 2.43 | 12,950 | <30 seconds |
| 3, inventive | C | 2.43 | 12,650 | ~8 minutes |
| 4, control | D | 2.43 | 12,250 | ~5 minutes |
| 5, control | E | 2.43 | 13,450 | ~18 minutes |
| 6, control | F | 2.38 | 10,575 | ~28 minutes |
| 7, control | G | 2.41 | 12,150 | ~24 minutes |
| 8, control | H | 2.42 | 10,300 | <30 seconds |
| 9, inventive | I | 2.47 | 11,700 | ~8 minutes |
| 10, control | J | 2.43 | 10,750 | <1 minute |
| 11, inventive | K | 2.43 | 13,500 | ~8 minutes |
| 12, control | L | 2.43 | 13,500 | ~5 minutes |
| 13, control | M | 2.43 | 12,250 | ~8 minutes |
| 14, inventive | C | 2.37 | 13,500 | ~7 minutes |
| 15, control | N | 2.59 | Phase separation | — |
| 16, control | C | 2.50 | 12,750 | ~80 minutes |
| Industrial Control | — | 2.18 | 12,700 | ~8 minutes |

The initial or green strength of each sample was also measured. This was done using a cross peeler test. 0.8 grams of the adhesive was dispensed at 121° C. onto a hard wood strip and then mated to a second hard wood strip to create a 1 inch cross section with adhesive coverage. Then after the indicated time points the tensile strength was measured and recorded as pounds per square inch (PSI). The results are reported below in Table 4 in PSI. As discussed above, the term green strength as used in the present specification and claims is defined as the strength developed within the first 30 minutes after application of the hot melt adhesive to a substrate.

TABLE 4

| Example | 5 minutes | 10 minutes | 15 minutes | 20 minutes | 25 minutes | 30 minutes |
|---|---|---|---|---|---|---|
| 1 | 129 | 129 | 130 | 136 | 157 | 158 |
| 2 | 107 | 123 | 124 | 127 | 129 | 135 |
| 3 | 66 | 112 | 121 | 127 | 131 | 139 |
| 4 | 74 | 119 | 127 | 129 | 139 | 141 |
| 5 | 22 | 22 | 25 | 27 | 31 | 38 |
| 6 | 18 | 20 | 20 | 22 | 22 | 26 |
| 7 | 18 | 21 | 23 | 23 | 26 | 27 |
| 8 | 129 | 130 | 132 | 136 | 140 | 148 |
| 9 | 52 | 131 | 137 | 140 | 144 | 147 |
| 10 | 119 | 138 | 142 | 154 | 190 | 195 |
| 11 | 63 | 122 | 124 | 138 | 142 | 148 |
| 12 | 54 | 83 | 93 | 102 | 114 | 121 |
| 13 | 35 | 42 | 43 | 45 | 46 | 46 |
| 14 | 55 | 78 | 118 | 133 | 147 | 156 |
| 15 | — | — | — | — | — | — |
| 16 | 27 | 36 | 42 | 45 | 51 | 55 |
| Industrial Control | 78 | 132 | 132 | 140 | 152 | 160 |

A series of additional mechanical tests were performed on some of the samples after they were fully cured as described below in Table 5 utilizing a Rheometrics RDA II test machine. The value G' is the storage modulus. A higher value of G' at 90° C. indicates improved mechanical properties at the higher temperature of 90° C.

TABLE 5

| Example | G' at 90° C. (Pa) |
|---|---|
| 1 | 7.32E+06 |
| 3 | 6.38E+06 |
| 7 | 1.42E+7 |
| 9 | 6.75E+6 |
| 11 | 7.74E+06 |
| 12 | 1.36E+07 |
| 14 | 7.07E+06 |
| 16 | 2.88E+06 |
| Industrial Control | 2.59E+06 |

The fully cured samples were further tested for additional mechanical properties as shown below in Table 6 using an Instron testing machine.

TABLE 6

| Example | Elongation at break % | Yield Strength (PSI) | Tensile Strength (PSI) |
|---|---|---|---|
| 1 | 453 | 989 | 1747 |
| 3 | 585 | 889 | 1828 |
| 7 | 632 | 521 | 1609 |
| 9 | 548 | 973 | 1721 |
| 11 | 589 | 979 | 1807 |
| 12 | 418 | 920 | 1860 |
| 14 | 528 | 1151 | 1876 |
| 16 | 757 | 754 | 1710 |
| Industrial Control | 814 | 607 | 1415 |

In experiments designed to further validate the usefulness of the disclosed adhesive compositions utilizing the inorganic filler and the polyester diols according to Formula 1 or 2 further testing was conducted using the Industrial Control as the base adhesive formulation. In a first series of experiments the Industrial Control was combined with the filler Calwhite® at a ratio of 75 parts by weight Industrial Control and 25 parts by weight of Calwhite®. This produces an adhesive composition with a viscosity at 121° C. of 18,500 cps and an open time of only 1 minute. Clearly, just adding the filler to the Industrial Control had a very negative effect on both the open time and the viscosity. This short open time makes the adhesive composition unsatisfactory for virtually all applications and the high viscosity is also problematic for getting wet out of the adhesive composition. In another experiment the Industrial Control was prepared with an enhanced amount of 4,4'-MDI to reduce the viscosity, then this was combined again in a ratio of 75 parts by weight Industrial Control with 25 parts by weight Calwhite®. The resulting adhesive composition had a viscosity of 11,800 cps at 121° C., very close to the other examples, however the open time was only 2 minutes. Again, this short open time is not satisfactory for virtually all applications. This further confirms that even if the viscosity is controlled, addition of the inorganic filler to the Industrial Control significantly reduces the open time to a level that is unacceptable for industrial uses.

The disclosed adhesive compositions comprise a polyisocyanate, at least one polyether polyol polymer, at least one acrylic polymer, an inorganic filler, and at least one polyester diol according to Formula 1 or 2. The disclosed compositions provide an adhesive composition having an open time of 6 to 10 minutes, a viscosity at 121° C. of from 4,000 to 25,000 cps, preferably from 5,000 to 25,000 cps and more preferably from 8,000 to 18,000 cps, a green strength after 30 minutes of greater than 120 psi. When cured these compositions have at least one of a yield strength of at least 607 psi and/or a tensile strength of at least 1415 psi and a storage modulus at 90° C. of at least 2.59 E+06.

The present disclosure provides a hot melt adhesive having a good open time, significant green strength, high final strength and it allows for incorporation of a significant level of non-fossil fuel based filler. The adhesive fills an important role in advancing the art. The long open time is particularly useful in panel lamination processes.

The foregoing disclosure has been described in accordance with the relevant legal standards, thus the description is exemplary rather than limiting in nature. Variations and modifications to the disclosed embodiment may become apparent to those skilled in the art and do come within the scope of the disclosure. Accordingly, the scope of legal protection afforded this disclosure can only be determined by studying the following claims.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

We claim:

1. A moisture reactive hot melt adhesive composition that is the product of a mixture comprising a polyisocyanate, at least one polyether polyol polymer, an acrylic polymer, from about 10 to about 50% by weight of an inorganic filler, and a having a structure of Formula 2, wherein:

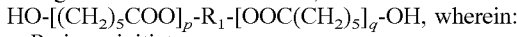

$R_1$ is an initiator;
   p is an integer from 0 to 96;
   q is an integer from 0 to 96;
   p+q=16 to 96; and
   the polycaprolactone polyol of Formula 2 has a number average molecular weight of from about 2,000 to about 11,000; and
   the acrylic polymer is free of active hydrogen groups.

2. The moisture reactive hot melt adhesive composition of claim 1, wherein $R_1$ is a residue of a glycol initiator selected from the group consisting of 1,4'-butanediol, 1,6'-hexanediol, ethylene glycol, and any combination thereof.

3. The moisture reactive hot melt adhesive composition of claim 1, wherein the at least one polyether polyol polymer has a number average molecular weight of from about 2,000 to about 10,000 and is present in an amount of from about 10 to about 35% by weight, based on the total weight of the adhesive composition.

4. The moisture reactive hot melt adhesive composition of claim 1, wherein the at least one polyether polyol polymer has a number average molecular weight of from about 1,500 to about 6,000 and is present in an amount of from about 15 to about 40% by weight, based on the total weight of the adhesive composition.

5. The moisture reactive hot melt adhesive composition claim 1, wherein the acrylic polymer has a weight average molecular weight of from 30,000 to 80,000, and is present in an amount of from about 10 to about 40% by weight, based on the total weight of the adhesive composition.

6. The moisture reactive hot melt adhesive composition of claim 1, wherein the acrylic polymer has a glass transition temperature of from about 35° C. to about 85° C. and a hydroxyl number of less than 8.

7. The moisture reactive hot melt adhesive composition of claim 1, wherein the polyisocyanate is present in an amount of from about 5 to about 40% by weight, based on the total weight of the adhesive composition.

8. The moisture reactive hot melt adhesive composition of claim 1, wherein the polyisocyanate comprises 4,4'-methylenebisphenyldiisocyanate.

9. The moisture reactive hot melt adhesive composition of claim 1, wherein the inorganic filler comprises calcium carbonate.

10. The moisture reactive hot melt adhesive composition of claim 1, further comprising an additive selected from the group consisting of an additional filler, a plasticizer, a catalyst, a colorant, a rheology modifier, a flame retardant, a UV pigment, a nanofiber, a defoamer, a tackifier, a curing catalyst, an anti-oxidant, an adhesion promoter, a stabilizer, a thixotropic agent, and any mixture thereof.

11. The moisture reactive hot melt adhesive composition of claim 1, wherein the adhesive composition has an open time of from about 6 to about 10 minutes.

12. The moisture reactive hot melt adhesive composition of claim 1, wherein the adhesive composition exhibits a green strength of greater than about 120 pounds per square inch (psi) within 30 minutes after application to a substrate.

13. An article of manufacture comprising the moisture reactive hot melt adhesive composition of claim 1.

14. The moisture reactive hot melt adhesive composition of claim 1, wherein the adhesive composition consists of:
   from about 5 to about 40% by weight of the polyisocyanate;
   from about 15 to about 40% by weight of the polyether polyol polymer;
   from about 10 to about 40% by weight of the acrylic polymer;
   from about 15 to about 50% by weight of the inorganic filler; and
   from about 10 to about 35% by weight of the polycaprolactone polyol.

15. The moisture reactive hot melt adhesive composition of claim 1, wherein the acrylic polymer is free of amino-functional groups and/or acrylonitrile monomers.

16. The moisture reactive hot melt adhesive composition of claim 1, wherein the acrylic polymer is a polymer or copolymer formed from acrylates, methacrylates, and any mixture thereof.

17. The moisture reactive hot melt adhesive composition of claim 1, wherein the at least one polyether polyol polymer comprises a first polypropylene glycol having a number average molecular weight of from about 1500 to about 3000, and a second polypropylene glycol having a number average molecular weight of from about 3000 to about 6000.

18. The moisture reactive hot melt adhesive composition of claim 1, wherein the adhesive composition:
has an open time of from about 6 to about 10 minutes,
exhibits a green strength of greater than about 120 pounds per square inch (psi) within 30 minutes after application to a substrate,
a yield strength of greater than or equal to 607 psi and/or a tensile strength of greater than or equal to 1415 psi, and
a temperature stability with a storage modulus at 90° C. of equal to or greater than 2.59 E+06.

19. A moisture reactive hot melt adhesive composition that is the product of a mixture comprising a polyisocyanate, at least one polyether polyol polymer, an acrylic polymer, from about 10 to about 50% by weight of an inorganic filler, and a polycaprolactone polyol having a structure of Formula 2, wherein:
Formula 2 is:
$HO\text{-}[(CH_2)_5COO]_p\text{-}R_1\text{-}[OOC(CH2)_5]_q\text{-}OH$, wherein:
$R_1$ is an initiator;
p is an integer from 0 to 96;
q is an integer from 0 to 96;
p+q=16 to 96; and
the polycaprolactone polyol of Formula 2 has a number average molecular weight of from about 2,000 to about 11,000; and
the adhesive composition is free of stabilizer and has an open time of between about 6 and about 10 minutes.

20. The moisture reactive hot melt adhesive composition of claim 1, wherein $R_1$ is a residue of ethylene glycol.

* * * * *